No Printed Specification Available
8420X
A. HAYWARD.
FIRE PLACE.
Patented Sept. 25, 1834.
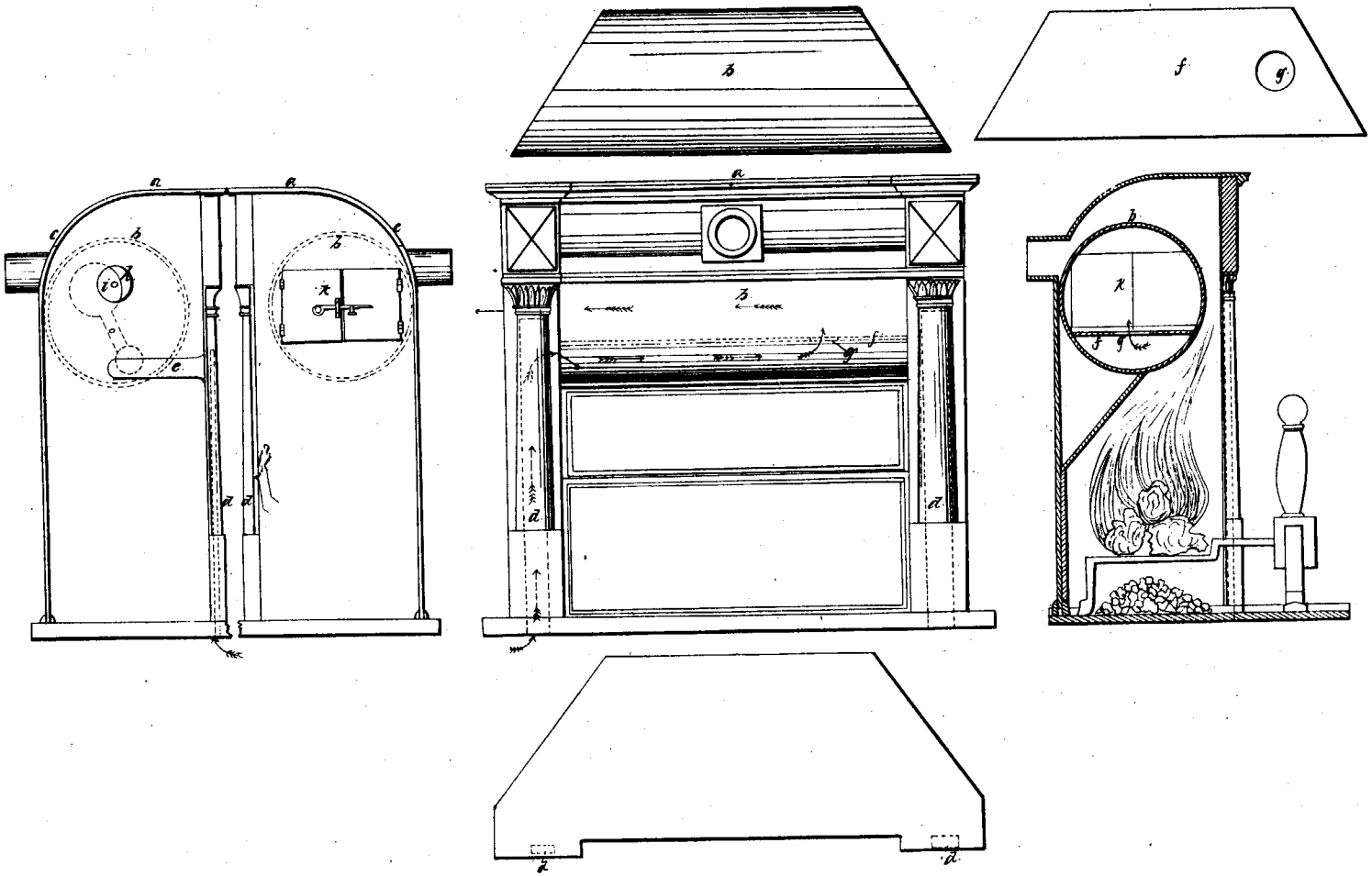
THE NORRIS PETERS CO., PHOTO-LITHO., WASHINGTON, D. C.

Ansel Hayward of Easton, Massachusetts,

Letters Patent,

The schedule referred to in these Letters Patent and making part of the same, containing a description in the words of the said Ansel Hayward himself of his improvement in the common Cast Iron fire place ——

Now. To all to whom these presents shall come, Ansel Hayward of Easton in the County of Bristol & Commonwealth of Massachusetts, Cabinet maker sends Greeting —— And declares that he has invented a new and useful improvement in the construction of the common fire place, and that the following is a full and exact description of the construction and use of said improvement, as invented by him —— My improvement consists in applying to the common cast iron or other metal fire frame, a cast or wrought iron hot air chamber, of any form or of any size which may be found most convenient (that in the accompanying model is made cylindrical) which air chamber is fixed near the top of the fire frame, and so that the ascending smoke and flame shall pass over and around it in part, it being so placed as to make part of the smoke flue, and the top of the fire frame, is cast in a bonnet shape to accommodate said air chamber. The pillars in front are cast hollow, through one or both of which a current of cold air obtained from such source as may be desired, is made to pass and communicate with said air chamber; by a metal pipe as is shown in the model, or in any other way which may be desirable. A thin metal plate, making a false or moveable bottom, is made to lay in said air chamber and reaching its whole length a little elevated from the permanent bottom, and so constructed at Drawing

[illegible] [illegible] the [illegible] [illegible] [illegible] [illegible] an about
[illegible] [illegible] the whole of the orifice through which
the cold air enters [illegible] [illegible] current shall first pass the
whole length of the air chamber between the permanent &
false bottom [illegible] when it reaches the opposite end of
the air chamber it meets a hole cut for the purpose in
said false bottom through which it passes, and repassing
the whole length of the said chamber is then discharged
into the room in a heated state through an orifice above
the feeding pipe connected with the air chamber, to which
the feeding pipe is attached; and on the inside is a valve
constructed and formed, as to shut off the cold air, by
closing the mouth of the feeding pipe and also to close
at the same time the discharging orifice when required, &
this valve is especially useful and necessary when the
air chamber is used as an oven for which it is particular
ly designed when not used to pass hot air into the room
On the end of the air chamber, opposite to that where
the cold air is supplied, is attached a common oven
door, and by shutting the valve as before mentioned
an oven of the most convenient form is at once made,
The accompanying model fully illustrates my said improve
-ment in all its parts, but the form may be varied at
pleasure, —— All that I claim as my said inven-
-tion notwithstanding what may be herein before stated
is the application of a hot air chamber near the top of
the common fire frame supplied with cold air through one
or both of the front pillars or otherwise for the double purpose
of heating rooms and affording an oven always ready for
use, I also claim as my invention the circular form of
the top of the fire frame whether used for a hot air chamber
or not ——— In testimony that the above is a true spe
cification of my said improvement as above described, I have hereunto set my hand this thirty first day of July in the year of our Lord one thousand eight hundred and thirty four Witness Robert Hooker Junr. } Russel Hagward.
Mor. A. Dexter }

660 acs

Ex.
Ch. M